United States Patent [19]

Murray

[11] 4,427,610
[45] Jan. 24, 1984

[54] METHOD AND APPARATUS FOR CURING CONCRETE PRODUCTS

[75] Inventor: John A. Murray, Norristown, Pa.

[73] Assignee: Conger/Murray Systems, Inc., Palm Beach, Fla.

[21] Appl. No.: 337,428

[22] Filed: Jan. 6, 1982

[51] Int. Cl.³ .......................... C04B 15/14; B28B 3/04; B28B 7/10; B28B 17/02

[52] U.S. Cl. ..................................... 264/82; 264/234; 264/333; 425/404; 425/445

[58] Field of Search .......................... 264/82, 234, 333; 425/445, 446, 404

[56] References Cited

U.S. PATENT DOCUMENTS

| | | | |
|---|---|---|---|
| 2,917,778 | 12/1959 | Lyon et al. | 246/82 |
| 3,468,993 | 9/1969 | Birrlich | 264/82 XV |
| 3,492,385 | 1/1970 | Simunic | 264/82 |
| 4,093,690 | 6/1978 | Murray | 264/82 |
| 4,117,059 | 9/1978 | Murray | 264/82 |
| 4,117,060 | 9/1978 | Murray | 264/82 |

Primary Examiner—Philip E. Anderson
Attorney, Agent, or Firm—Austin R. Miller

[57] ABSTRACT

A method and apparatus for rapidly manufacturing concrete or like poducts having an advanced state of cure by blending together a calcareous cementitious binder, aggregate, and water to form a mix, molding the mixture to have a predetermined shape and exposing the shape to an atmosphere in a chambr consisting essentially of carbon dioxide gas, wherein ultracold carbon dioxide gas is fed to said chamber during the movement of the shape therein and continuing the feed so as to cause an exothermic temperature rise in the shape.

13 Claims, 1 Drawing Figure

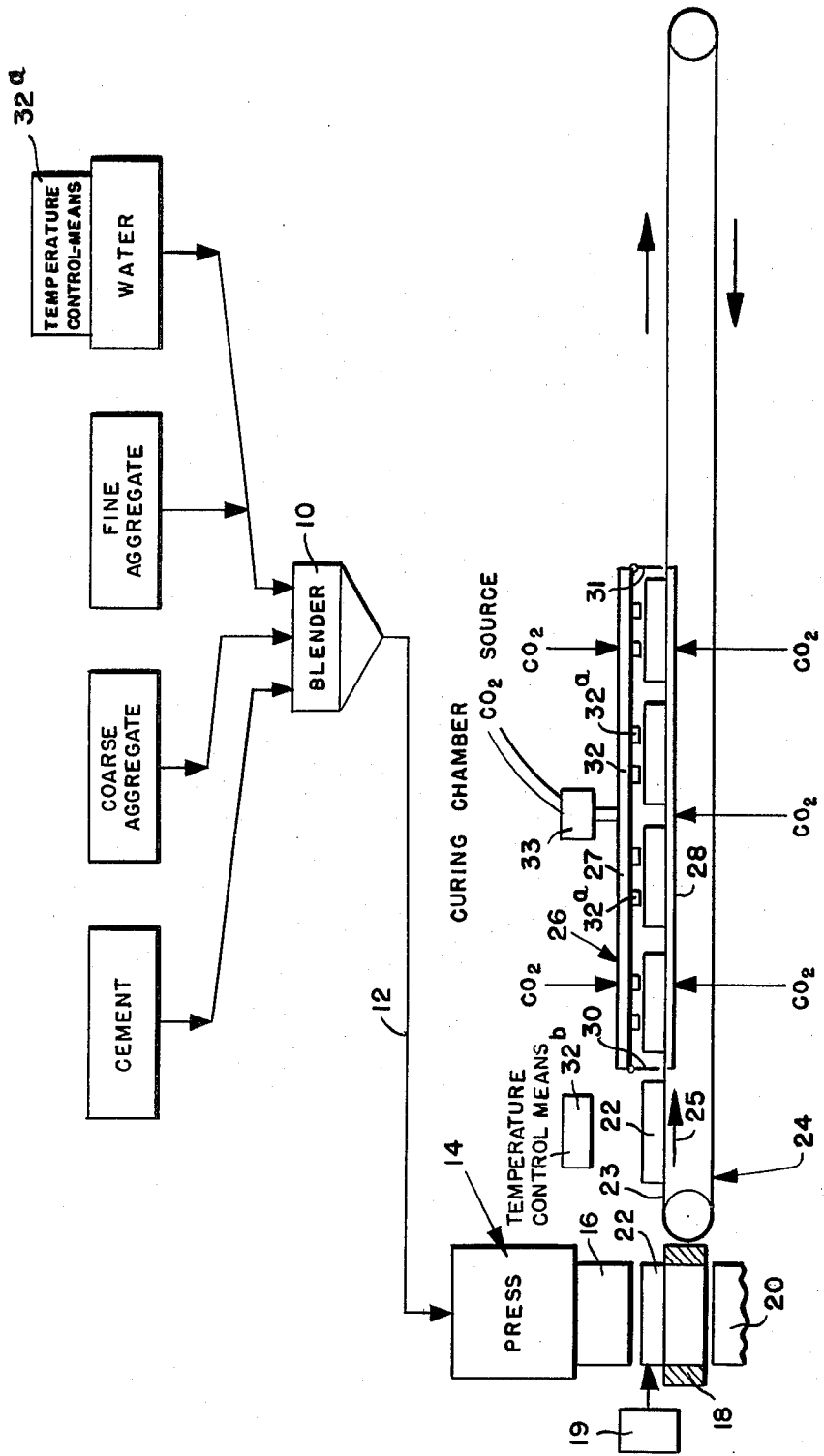

METHOD AND APPARATUS FOR CURING CONCRETE PRODUCTS

BACKGROUND OF THE INVENTION

This invention relates to a method and apparatus for the manufacture of concrete and like products, particularly, concrete and cinder block, and substantially all other conventional building products and the like. More particularly, this invention relates to a method and apparatus for curing concrete products using a carbon dioxide atmosphere.

The term "concrete", as it is employed in this specification, refers to a stone-like product obtained by blending a cement, aggregate such as sand, gravel, crushed stone, and many other like additives, and water together in appropriate amounts, and allowing the mixture to harden and reach an advanced state of cure. "Concrete-like" is extremely broader, and encompasses the materials having certain physical properties of concrete products, having perhaps substitutes for aggregate normally so used. They may be load-bearing or non load-bearing and may if desired include binders and/or aggregates that are selected to impart desired structural characteristics and/or decorative characteristics to the final product.

DESCRIPTION OF THE PRIOR ART

In prior art method of manufacturing concrete products, for example, the cement, aggregate, additives if any, and water are blended in various ratios. In general, a sufficient amount of water is added to completely hydrate the cement and also to impart a degree of fluidity (substantial liquidity) to the blended mixture generally referred to as a wet mix. The blended mixture is then poured or compacted into a form and allowed to take an initial set. The initial set usually occurs within ½ hour to 4 hours, depending upon the temperature and the particular concrete mixture employed. The concrete product, after this initial set, is solid, but has very little strength. In order to obtain a maximum strength possible with a given concrete composition using the prior art manufacturing techniques, the concrete is generally allowed to cure for a period of time from several days, to several weeks.

The excessively long period of time required for both the initial set, and particularly for the development of the ultimate strength, causes considerable problems in the manufacture of cast concrete products. The concrete mixture must remain in the mold until the product acquires sufficient strength that it will not fall apart when the mold is removed. Furthermore, the concrete product, even after the mold is removed, must be allowed to cure for an extended period of time before it is subjected to any substantial stresses. The need to maintain the concrete products in the mold until the initial set is obtained, and for curing the products until the ultimate strength is developed requires a substantial inventory of molds and a rather large storage area for the products being processed. Of even greater consequence is the cost involved in the prior art processes since the handling of weak products obtained after the initial set and the storage of products for several days or weeks until fully cured is quite costly in both manpower and storage space. Often, of even greater consequence is the cost in terms of rejects or of imperfections in the products due to internal stresses and even fractures that result from handling a weak product. Other deficiencies in prior art techniques include the shrinkge characteristics of the panels, especially high shrinkage during an extended period of cure, and differential shrinkage rates, e.g., between the outer surface and the inside of the product.

In the conventional method, a concrete mixture containing the desired type of aggregate is either poured or compacted into a suitable mold. The mold is then stored until the mixture initially sets. This usually requires a discontinuous process, rather than a continuous sequence of steps.

Attempts have heretofore been made to decrease the cure time in the manufacture of concrete and like products. Such attempts have included the various types of accelerators that have been added to concrete mixtures, as well as heating and steaming processes, during manufacture. These methods at best have produced marginal improvements with respect to reducing the curing time and have been somewhat expensive. For example, in high pressure steam with or without carbon dioxide gas, curing the product required a period of twelve to twenty-four hours, in order to obtain a satisfactory hardness and strength in the final product. In addition, certain of the processes had adverse effects upon the composition. High pressure steaming of concrete products containing substantial amounts of marble or limestone, for example, causes a very marked decrease in the ultimate compressive strength of the final product.

In order to increase the strength of concrete products, certain additives have heretofore been suggested. These additives include materials which to some extent plasticize the finished concrete product so as to increase its compressive strength. Additives have been suggested to improve the properties of concrete products, including bituminous materials and various types of rubbers and emulsions of synthetic resins.

Other prior art techniques have been developed that are usable, to a certain degree, with certain of the processes that have been developed for many of the materials set forth above. For example, it is known to treat certain concrete-like products with carbon dioxide gas, by storing the products in a chamber that has been pre-charged with gas, for the purpose of effecting a skin cure on the surface of the products, and of a limited depth of cure, sufficient to enable further handling of the products. Indeed, generally, with the formation of a skin cure, that cure in itself inhibits deeper curing by the use of the carbon dioxide gas.

Other treatment processes have been developed, such as the use of alternate exposure to steam and carbon dioxide gas.

OBJECTS OF THE INVENTION

The present invention is directed to the provision of an accelerated curing process for concrete and concrete-like products, by initiating the curing after the ingredients are compressed and by exposure of the ingredients to ultracold carbon dioxide gas until an advanced state of cure is obtained.

An article thus reaching an advanced state of cure may be sufficiently self-sustaining in its shape that it can be lifted, for example, by vacuum or suction cup techniques or the like, for removal to subsequent treatment or storage stations, and preferably for early use thereafter.

Accordingly, it is a primary object of this invention to provide a novel method for making concrete and concrete-like products.

It is a further object of this invention to provide novel apparatus for making concrete and concrete-like products.

It is another object of this invention to provide an advanced state of curing of concrete and concrete-like products.

It is a further object of this invention to provide apparatus and method for rapidly producing concrete and concrete-like products, wherein the products may reach an advanced state of cure at an early time.

Other objects and advantages of the present invention will become readily apparent to those skilled in the art from a reading of the following brief descriptions of the drawing figures, detailed descriptions of the preferred embodiments and the appended claims.

The term "concrete" as it is employed in this specification, refers to a stone-like product obtained by blending a cement, aggregate such as sand, gravel, crushed stone and other like additives, and water together in appropriate amounts and allowing the mixture to harden and reach an advanced state of cure. Concrete-like is much broader, and encompasses materials having certain physical properties of concrete products, having, in some cases, substitutes for the aggregate normally so used. They may be load-bearing or non-load-bearing and may, if desired, include the binders and/or aggregates that are selected to impart desired structural and/or decorative characteristics to the final product.

Furthermore, by way of background, it will be noted that concrete and concrete-like products continue to undergo curing for an indefinitely long period of time, perhaps thirty years or more. In this application, when reference is made to the "substantially fully cured", "cured", "fully cured" or the like products, it will be understood that what is intended is that the cure is sufficiently advanced to enable not only handling of the product, but also further movement and perhaps processing thereof, while in that state of cure, without the product breaking, crumbling or disintegrating and that curing continues over a long period of time thereafter toward a complete cure.

SUMMARY OF THE INVENTION

The present invention is directed toward providing method and apparatus, wherein calcareous cementitious binder, such as cement or other binders, aggregate, and a minor amount of water are blended, shaped and then treated with ultracold carbon dioxide gas in a sealed chamber, during which a rapid exothermic reaction takes place wherein the ingredients undergo an advanced state of cure in a short period of time, sufficient to enable the hardening thereof.

BRIEF DESCRIPTION OF THE DRAWING

Shown in the drawing is a schematic illustration which illustrates sequential stages in the manufacture of a product, in accordance with the method and apparatus of the present invention.

As indicated in the drawing, the mix is uniformly blended, by continuing a mixing operation with respect thereto. The moist mixture thus obtained is relatively dry, as compared to fluid, soupy mixtures generally employed to make concrete products, in accordance with prior art techniques. Preferably, in accordance with this invention, the mixture should have a relatively stiff consistency. Optionally, means is provided for controlling the water temperature used in the mix for reasons which will be hereinafter stated.

The particular type of blending apparatus employed to obtain the starting mixture is not critical providing it sufficiently blends the starting materials. One type of blender which has, however, proven to be satisfactory is a turbine mixer, the delivery to which is accomplished by a screw conveyor since this provides a very complete mixture of the starting materials in a short period of time. Alternatively, a double screw blender could be utilized. In addition to the blender 10, a screw feeder can be provided in the feed-line 12 to both further mix the ingredients of the mixture and also to facilitate the transfer and metering of the mixed material to the press 14. Alternatively, the feed-line 12 could perform no substantial mixing, but function only as a conveying device.

The press 14 is preferably of the type which can press the moist mix obtained so as to provide a given shape that is capable of being sustained during the remainder of the operation. Positioned below the controlled-motion upper compressive member 16 of the press 14 is a mold 18. The mold shown is for making building blocks. Associated with the mold 18 is a removing or discharging means 20 for removing the pressed, uncured block 22 from the mold 18. The discharging, removing, or ejecting means may vary from the type 20 illustrated in the drawing, and for example, may comprise a vacuum or suction lift from the press 14 through the member 16, separately or in addition to the type 20, to facilitate a removal or a discharge of the blocks from the mold without unduly stressing the blocks or other forms, and most particularly, without causing internal fractures therein. Assisting the discharging means 20, after the ejection means has upwardly lifted a given block such as 22, is a moving means 19, that may preferably comprise a component of the press, that facilitates the moving, depositing, or other transportation of the block or the like 22 onto an upper run 23 of a conveyor belt 24. It will be understood, that by making modifications in the upper compressive member 16, and in the mold 18, any suitable building structure may be compressed in the press. Accordingly, while the press, and the conveyor and chamber of this invention are illustrated with respect to their adaptability for making blocks or the like, such should not be construed as being limiting, but only as representative of a particular type of product being processed.

The moist starting material, prepared as discussed hereinabove, is fed into the mold 18, and in a weighed amount sufficient to make a panel, block, brick, etc., or the like of the desired thickness. The mold 18 is positioned below the member 16, and the press is activated. The member 16 compresses the mixture into a compacted shape, such as a block or the like 22, which has sufficient structural integrity to be removed from the mold by the ejector means, suction or the like 20, in cooperation with the transfer means or depositing means 19 or the like, without the shape 22 breaking apart.

After depositing the shape 22 onto the upper run 23 of the conveyor 24, the shape 22 is advanced rightward, as viewed in the drawing, in the direction of the arrow 25 thereof, while resting and being carried on the upper run 23 of the conveyor 24. The conveyor 24 is of the belt type, but specifically will preferably be constructed of linked chain or the like, to have voids through the bottom thereof, in order to allow permeation of the chain's upper run 23, with carbon dioxide gas, for treating the lower surface of the shape 22, that rests upon the run 23 of the belt or the like. Accordingly, the precise details of construction of the conveyor belt 24 may vary, within capabilities of accomplishing this end, of allowing permeation thereof, for subjecting the underneath of a shape 22 to the curing gas.

In accordance with one embodiment of the present invention, it has been discovered that the temperature of the shaped cementitious product should be about 60°–95° F. prior to entering the carbon dioxide curing chamber. This feature is important in order to achieve rapid curing by the carbon dioxide. In order to obtain the desired temperature range, there may be provided a temperature control means for heating the water utilized in blending the cement and the aggregate. When the cement in the blender 10 is fed to the mold 18 at a temperature between about 60°–65° F., the resultant shape 22 possesses sufficient green strength to maintain its shape even with handling. This is due to the fact that the cementitious mixture must be at least 45° F. for hydration to begin. Having the mix at a temperature between about 60°–95° F. prior to entering the curing chamber permits the formed configuration to have sufficient hardening, especially when the amount of water in the mix is kept to a minimum. In order for the block 22 to have the desired temperature prior to entering the curing chamber, temperature control means 32a may be provided so as to preheat the mix prior to entering the mold.

Alternatively, a temperature control means 32b may be provided so as to preheat the shaped article 22 to the desired temperature range prior to entering the curing chamber. This type of temperature control means is not critical and can include any means for raising the temperature of the shape including a radiant heater or a steam jet.

The block 22 is then advanced into a carbon dioxide chamber 26. The chamber 26 should be built so as to be relatively gas tight. Thus, the chamber will have sides 27, along both sides of the conveyor belt 24, and a lower end 28, and its entry and exit ends 30 and 31 will be provided with flexible entry and exit curtains that function as gas retaining means. These curtains may, for example, be of the rubber flap type, or other suitable types that are activated by the panels or other products, to be moved aside by entry or exit of the product at the entrance and exit ends of the chamber 26. These curtains are used so as to retain a sufficient amount of the gas inside the chamber to maintain a controlled carbon dioxide gas environment while permitting flow of gas from the chamber through the curtains. Also the curtains minimize carbon dioxide losses as the blocks 22 enter and leave the chamber 26. However, it will be understood that, considering that the blocks or other shapes 22 are supported on the upper run 23 of a preferably open mesh chain type conveyor belt, for the above mentioned purpose of allowing carbon dioxide gas to pass through the belt and contact the bottom portions of the shapes 22 during the processing within the chamber 26, it will be recognized that certain amounts of carbon dioxide gas will be carried out of the chamber 26 through the exit end 31 thereof, with the movement of the belt, and along with the shapes 22 as such shapes 22 pass outwardly because of the continuous movement of the belt through the chamber. Moreover, of course it will be understood that minor amounts of air and the like will enter the chamber 26, as portions of the upper run 23 of the conveyor belt 24 enter the chamber 26, and as the shapes themselves 22 enter the chamber 26, such air being that existing in the environment of the location of the chamber 26.

Furthermore, the inlet means 30 may be especially configured to have slits, opening ports, or merely to have a sufficiently loose curtain arrangement as to permit a controlled amount of carbon dioxide gas to emanate from the inside of the chamber 26, outwardly through the flexible means 30, in an upstream direction, or with a counter-current flow, relative to the direction of movement of the shape 22 as it passes into the chamber 26. Of course, with the carbon dioxide gas within the chamber 26 being discharged through small openings, orifices, slits, or other openings in the retaining means 30, 31, this creates a flow of the carbon dioxide gas, directed outwardly of the chamber from inside thereof.

The chamber 26 is provided with a plurality of tubes 32 with inlets 32a for carbon dioxide gas, with such tubes 32 being provided at both the top and bottom, or upper and lower ends respectively of the chamber 26, preferably entering from above the blocks 22, in order to obtain an even gas flow and distribution over the entire article.

It will be appreciated that a considerably larger number of such tubes are preferably employed to introduce the carbon dioxide gas into the chamber 26.

For maximum benefit of the processes and apparatus of this invention, the relative height of the upper tubes 32 from the blocks 22 is a highly critical factor, in effecting the advanced state of curing substantially completely throughout the thickness of the shapes. In order to obtain the maximum benefits of this invention, the height of the upper tubes from the shape should not be excessive relative to the shape being cured. Preferably the height of the upper tubes above the shapes should be within the range of about 1 to about 4 times the thickness of the block or other shape being processed.

An important feature of the present invention resides in the utilization of ultracold carbon dioxide gas, namely, carbon dioxide gas which is at a temperature of about 0° to −69.9° F. It has been discovered that the use of ultracold carbon dioxide produces radically improved results despite the apparent conflict between low carbon dioxide temperature and the necessarily relatively high temperature of the cementitious mixture. Suprisingly, the ultracold gas upon contacting the warm mix does not disturb or hinder the ensuing cementitious reactions but surprisingly enhances them instead. Although all the reasons for this phenomenon are not fully understood, it is believed that unexpected advantage is obtained because the use of ultracold carbon dioxide gas results in a gas having a greater density of carbon dioxide molecules at atmospheric pressure. Consequently, there is a greater concentration of carbon dioxide molecules around the shaped block. The carbonation and hydration reactions take place quickly with an exothermic reaction, whereby the temperature of the block increases. It is preferable to utilize a mix wherein the particle size of the aggregate permits optimum penetration of the carbon dioxide because of its greater density.

It is not advisable to dilute the carbon dioxide gas which is used in the curing chamber since the CO concentration is also lowered, reducing curing speed. Furthermore, steam should not be added into the chamber in a manner to allow the cold carbon dioxide gas to precipitate the steam and to adversely affect the quality of the product.

Although it is preferable to maintain a humid atmosphere within the curing chamber, usually no additional moisture is required. Water is liberated as a result of the carbonization and hydration reaction. It is further advisable to limit the exposure of the blocks 22 to the carbon dioxide for a period of no more than 5 minutes, preferably about 1-2 minutes so as to avoid overexposure which leads to condensation of water on the block surface. Release of water (humidity) from the block is important and advantageous.

The carbon dioxide supplied to the chamber 26, through the tubes 32 thereof may be obtained from any convenient source. Bottled carbon dioxide gas is the most conveniently used in most installations. The gas should be comprised essentially of carbon dioxide with at most minor amounts of other gases being present. The pressure of the carbon dioxide which is maintained inside the chamber is substantially at atmospheric pressure or zero pounds per square inch gauge.

It is preferred to operate the process of this invention with the carbon dioxide being delivered through the ports 32a at a sufficiently low gauge pressure, e.g. 0 to 10 PSIG, so that the pressure within the chamber 26 is at atmospheric pressure, or substantially at atmospheric pressure, but not below. This will allow the carbon dioxide gas to engulf or enshroud the blocks 22 and to seep or billow out of the inlet end 30 of the chamber 26, for the purpose above discussed, and to prevent the infusion of atmospheric air, especially in undesired amounts, into the chamber. This is because the composition of atmosphere inside the chamber 26 should be essentially carbon dioxide and water vapor (humidity). Under ideal conditions, the carbon dioxide content of the atmosphere inside the chamber 26 should be at least 95%, and preferably higher, for example, 98% plus, excluding variable amounts of water vapor released from the cementitious mixes.

The temperature of the gas as it emerges from the tubes 32 is normally about 0° to minus 70° F. Because of the relatively high temperatures of the work objects, the heat of reaction and the release of water vapor in the chamber, the temperature of the introduced carbon dioxide increases with time while the carbon dioxide is in the chamber. It is sometimes desirable to provide further cooling means 33 to attain the low temperature required for the incoming carbon dioxide gas in accordance with this invention.

It should also be appreciated that there is a close interrelationship between the amount of water used in the starting mixture and the carbon dioxide. If an amount of water substantially in excess of that necessary for the article to retain its shape is employed, the mixture will not cure well in the carbon dioxide chamber. This is believed to be due to a lack of relative solubility of the carbon dioxide in water, and also because the excess water may prevent the carbon dioxide from penetrating into the concrete mixture being cured.

It is also believed that an excess of pressure of carbon dioxide within the chamber 26 may result in a rapid skin or shell cure or crusting that will subsequently prevent carbon dioxide gas penetrating the shape to interior portions, thereby preventing curing of the interior portions of the shape.

It has been found that, because the carbon dioxide gas works best in a slightly moist atmosphere (the moisture coming from the work objects), for the desired advanced state of cure with respect to the interior of the shapes being cured, the chamber must be of the type that will permit the generation of moisture in the environment therein during the reaction, and that will retain and continue to regenerate such moisture in the chamber's carbon dioxide environment, from the reacting blocks.

A further surprising effect of the method of this invention is that in spite of the fact that a relatively low amount of water is employed in the mixture, the substantially cured material is often found to have free water on its surface after an advanced state of curing has been achieved. This is believed to be due to a combination of interrelated reactions. The initial reaction is believed to be the hydration of the oxides of the cement by the water, which is then followed by a rapid carbonization of the resulting hydroxides by the carbon dioxide. The result is that the hydrate formed on hydration of the oxide is then converted into the corresponding carbonate, and the water initially used in the hydration reaction is freed and can react with additional unreacted oxide. In theory, if both the hydration reaction and the carbonization reaction go to completion, the entire amount of water added to the starting mixture should be recovered as free water. This would, of course, account for the presence of water on the surface of some substantially cured materials. While the above theory appears to be the logical explanation of the chemistry involved, it should be appreciated that applicant does not intend to limit his invention to the above theoretical explanation of the process.

The rapid curing with the resulting improved properties has made it possible to continuously manufacture concrete products, on a one-after-another or serial basis, which are ready for immediate shipment and early use as soon as they are cured in the carbon dioxide chamber. Thus, the curing chamber may be set up immediately downstream of the forming mold and, immediately after exit of the shapes from the chambers, they may be subjected to grinding, polishing, operations, or other finishing operations as desired, some of which subject the shapes to vigorous treatment, for example, polishing and abrading. together with exposure to streams, a physical treatment which would ordinarily disintegrate shapes prepared by prior art techniques, unless those shapes had been allowed to cure for period of weeks, or months, for example.

Thus, while this invention has been described with particular emphasis on the manufacture of cement block, and the like, the use of the method and apparatus of this invention is clearly not limited to the manufacture of blocks, or of any other building or construction material, but the method steps and apparatus of this invention can be used to produce a wide variety of different types of concrete and concrete-like products as have been discussed throughout this application.

The following Example is given by way of further illustration of the method of the present invention and is not intended in any way to limit the scope of the present invention beyond that of the subjoined claims. All parts and percentages expressed in the following Example are parts and percentages by weight, not volume, unless otherwise indicated.

EXAMPLE

Building blocks were prepared from the following mixture:

| | |
|---|---|
| Crushed concrete | 20 kgs. |
| Crushed burnt face brick | 10 kgs. |
| Ground limestone | 20 kgs. |
| Portland cement | 7 kgs. |
| Water | 4 kgs. |

The mixture was blended with the water being at a temperature of 65° F. and pressed into blocks 8"×12"×2½" thick.

The formed blocks, which were found to have a temperature of 60° F., were supported on a chain mesh conveyor belt and fed through a gas chamber having a height of 4". This chamber was charged with carbon dioxide gas introduced into the chamber through a plurality of tubes having a series of orifices positioned approximately 6" apart from each other along the top of the chamber. The pressure of the carbon dioxide in the chamber was delivered at 2 PSIG and at 0° F. from the carbon dioxide source but the pressure inside the chamber was maintained at atmospheric pressure or substantially at 0 PSIG. The speed of the conveyor belt was set so that the blocks to be cured remained in the chamber of 1-2 minutes. The blocks were found to be fully cured (as defined herein) and could be used for the formation of walls or the like in a building at an earlier time than is customary in the art.

It will be apparent from all of the foregoing that various modifications may be made in the details of construction of the apparatus of this invention, and in the use and operation of the method of this invention, including but not limited to operating with variations in the several parameters, all within the spirit and scope of the invention as recited in the appended claims.

I claim:

1. In a method of rapidly manufacturing concrete or like products having an advanced state of cure by blending together a calcareous cementitious binder, aggregate, and water to form a mix, molding the mixture to have a predetermined shape and exposing the molded product to an atmosphere in a chamber consisting of at least 95%, excluding water vapor, carbon dioxide gas, the improvement which comprises feeding carbon dioxide gas at a temperature in the range of about 0° to −70° F. to said chamber during the movement of the molded product therein, continuing the feed so as to cause an exothermic temperature rise in the molded product and exposing the molded product to the carbon dioxide gas for no more than 5 minutes.

2. The method of claim 1, wherein the molded product has a temperature of about 60°-95° F.

3. The method of claim 1, wherein the calcareous cementitious binder is portland cement.

4. The method of claim 2, wherein said molded product is a block.

5. The method of claim 1, wherein the pressure of the carbon dioxide gas entering the chamber is about 0-10 PSIG.

6. The method of claim 1, wherein the mix contains only sufficient water for the molded product or article to retain its shape.

7. A method of rapidly manufacturing building blocks products having an advanced state of cure comprising the steps of blending together portland cement, aggregate, and water in selected quantities sufficient to form a sufficiently low moisture mix to maintain its shape after molding into a shape during the subsequent curing, molding the mixture to have a predetermined shape, maintaining the molded product at a temperature of 60°-65° F., exposing the molded product having a temperature of 60°-65° F. to an atmosphere of at least 95%, excluding water vapor, carbon dioxide gas by moving the molded product through a chamber while feeding carbon dioxide gas at a temperature in the range of about 0° to −70° F. to the chamber during the movement of the molded product therein and continuing the exposure of the molded product to the carbon dioxide gas feed for a time sufficient to cause an exothermic temperature rise in the molded product.

8. The method of claim 7, wherein the pressure of the carbon dioxide gas entering the chamber is 0-10 PSIG.

9. The method of claim 7, wherein the movement of the molded product through said chamber is for a period of 1-2 minutes.

10. In an apparatus for the manufacture of concrete and like products having means for blending a desired cementitious mixture, means for molding the mixture to desired configurations, and for delivering the molded product thus formed for movement along a predetermined path, conveying means for moving the molded product thus formed to and through a chamber means, and chamber means substantially closed against the introduction of external air of the like for exposing the molded product to carbon dioxide gas during the movement thereof through the chamber means, the improvement which comprises means for feeding carbon dioxide gas at a temperature in the range of about 0° to −70° F. into said chamber.

11. The apparatus of claim 10, including means for preheating the molded product during their movement along the path just prior to entry of the molded product into the chamber means.

12. The apparatus of claim 10, wherein the carbon dioxide feed is at a height above the molded product of about 1 to about 4 times the height of the molded product and the carbon dioxide is fed into the chamber along the chamber length.

13. The apparatus of claim 10 having molded product inlet means and molded product outlet means at ends thereof, with the chamber being substantially closed against external environment except at ends thereof, said chamber having openable closure means at said ends thereof.

* * * * *